United States Patent [19]

Manseth

[11] Patent Number: 4,640,474
[45] Date of Patent: Feb. 3, 1987

[54] METHOD AND APPARATUS FOR AERIALLY TRANSPORTING LOADS

[76] Inventor: Robert A. Manseth, P.O. Box 9, Florence, Oreg. 97439

[21] Appl. No.: 762,771

[22] Filed: Aug. 5, 1985

[51] Int. Cl.⁴ .............................................. B64B 1/70
[52] U.S. Cl. ...................................... 244/31; 244/33; 244/94; 244/97; 244/137 R
[58] Field of Search ............... 244/30, 31, 33, 93, 244/94, 95, 96, 97, 137 R; 212/71

[56] References Cited

U.S. PATENT DOCUMENTS

| | | |
|---|---|---|
| 328,899 | 10/1885 | Morrison . |
| 541,102 | 6/1895 | Lomax . |
| 852,204 | 4/1907 | Shay . |
| 881,184 | 3/1908 | Halle . |
| 1,391,794 | 9/1921 | Rutherford . |
| 1,430,868 | 10/1922 | Weyrick . |
| 1,530,244 | 3/1925 | Dickinson . |
| 1,645,237 | 10/1927 | Henderson . |
| 2,141,469 | 12/1938 | Hansen et al. .................... 212/89 |
| 2,707,008 | 4/1955 | Bannister ...................... 144/309 |
| 2,740,598 | 4/1956 | Van Krevelen ................. 244/96 |
| 2,916,322 | 12/1959 | Wirkkala ....................... 294/112 |
| 3,022,747 | 2/1962 | McIntyre ....................... 104/178 |
| 3,055,622 | 9/1962 | Harmon ........................ 244/153 R |
| 3,151,825 | 10/1964 | Kindling ........................ 244/33 |
| 3,221,897 | 12/1965 | Matheson ..................... 212/71 |
| 3,249,237 | 5/1966 | Stewart ........................ 212/89 |
| 3,260,479 | 7/1966 | Eickmann .................... 244/17.13 |
| 3,270,895 | 9/1966 | Stewart ........................ 212/71 |
| 3,288,397 | 11/1966 | Fitzpatrick .................... 244/29 |
| 3,326,392 | 6/1967 | Rock ............................ 212/71 |
| 3,359,919 | 12/1967 | Stewart ........................ 104/22 |
| 3,369,673 | 2/1968 | Mosher ......................... 212/71 |
| 3,448,864 | 6/1969 | Fenn et al. .................... 212/71 |
| 3,456,903 | 7/1969 | Papst ............................ 244/30 |
| 3,620,028 | 11/1971 | Wilde ........................... 61/72.3 |
| 3,706,385 | 12/1972 | Stewart ........................ 212/71 |
| 3,807,617 | 4/1974 | Tanksley ...................... 226/196 |
| 4,055,316 | 10/1977 | Chipper et al. .............. 244/33 |

FOREIGN PATENT DOCUMENTS

| | | | |
|---|---|---|---|
| 494364 | 4/1977 | Australia . | |
| 165262 | 8/1956 | Denmark . | |
| 384148 | 3/1908 | France ....................... | 244/33 |
| 846805 | 9/1939 | France . | |

Primary Examiner—Trygve M. Blix
Assistant Examiner—Rodney Corl
Attorney, Agent, or Firm—Klarquist, Sparkman, Campbell, Leigh & Whinston

[57] ABSTRACT

A method and system for aerially transporting loads between a loading site and a discharging site. A lift balloon is ballasted with liquid ballast at a discharging site and propelled to a loading site, where a load is suspended from the balloon. The liquid ballast is removed from the balloon in an amount corresponding to the weight of the suspended load. The ballast is recirculated from the loading site to the discharging site through a conduit. At the discharging site, the balloon is reballasted and the load is removed therefrom. The liquid ballast may also be moved through an aerial conduit connecting the lift balloon to a ballast site. In a further aspect of the invention, an elongated envelope houses a plurality of pear-shaped balloons to reduce the aerodynamic drag thereon.

2 Claims, 8 Drawing Figures

FIG. 1
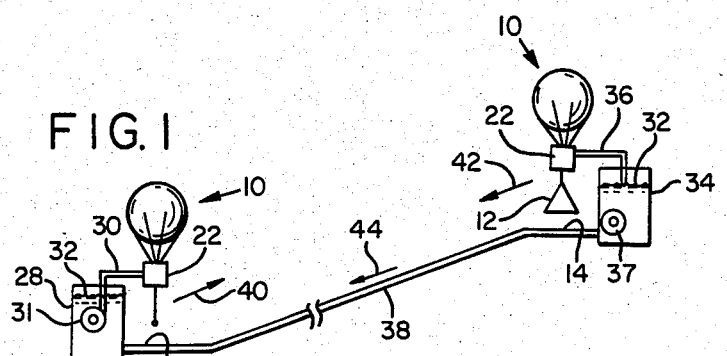
FIG. 2
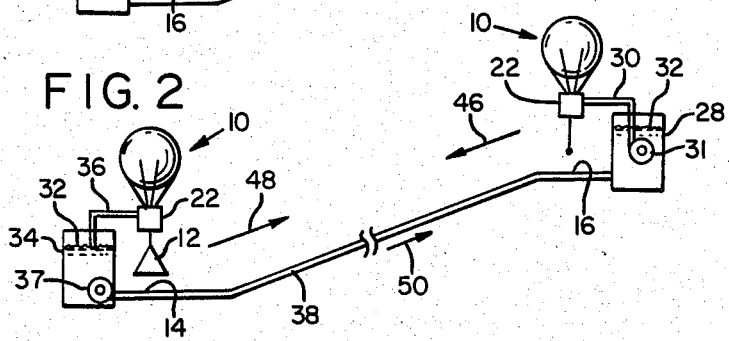
FIG. 3
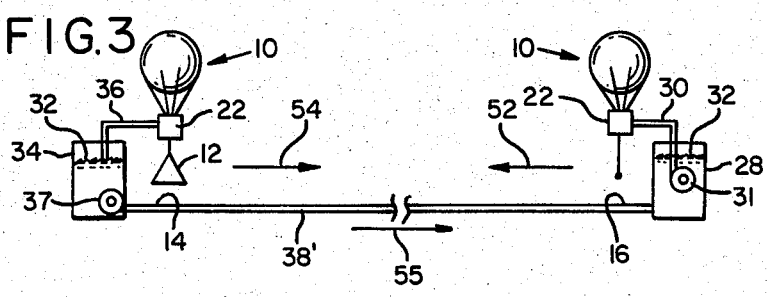
FIG. 4
FIG. 5
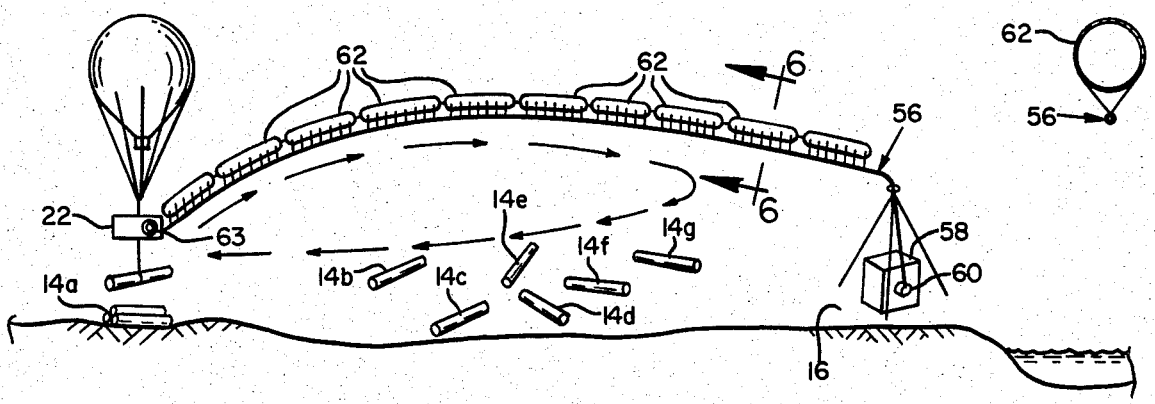
FIG. 6
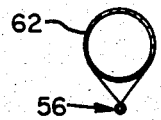

DIRECTION OF TRAVEL

METHOD AND APPARATUS FOR AERIALLY TRANSPORTING LOADS

BACKGROUND OF THE INVENTION

This invention relates to the aerially transporting of loads between sites and more particularly, to the transporting of such loads using a lift balloon.

The concept of aerially transporting loads such as logs with lift balloons is well known. Balloons provide a great amount of lift at relatively low cost and can be maneuvered to hover over a loading or discharging site.

A recent example of a method for aerially transporting loads between loading and discharging sites by balloons is disclosed in U.S. Pat. No. 4,055,316 to Chipper et al. There, the lift balloon is guided between the sites by an aerial cable. The balloon contains a liquid ballast container that can be filled with ballast to maintain the proper buoyancy of the balloon. At the loading site, liquid ballast is ejected in an amount corresponding to the weight of the load to be suspended from the balloon. Upon return to the load discharging site, liquid ballast is replaced in the ballast container and the load is removed from the balloon.

One drawback of Chipper et al. and other conventional balloons is the aerodynamic drag their pear shape creates. Specially shaped balloons may be formed to reduce this drag, such as shown in U.S. Pat. No. 3,369,673 to Mosher, but these balloons cost considerably more than conventional balloons.

Another drawback is the difficulty of maintaining the proper buoyancy of the balloon with the added weight of the load. Chipper et al. compensates by ejecting a corresponding amount of ballast. But this ballast is then lost and must be replaced by additional ballast. However, replacement may be impractical under conditions where water is not readily available, such as in remote logging areas.

SUMMARY OF THE INVENTION

It is an object, therefore, of the present invention to provide an improved method for aerially transporting loads between loading and discharging sites.

Another object of the invention is to provide a method for maintaining buoyancy of a lift balloon by compensating for an added load while conserving the ballast.

Another object of the invention is to provide a means for conserving the ballast removed from the balloon.

Still another object of the invention is to provide a means for reducing the aerodynamic drag on a pear-shaped balloon.

To achieve these objects, the present invention comprises a unique method and apparatus for aerially transporting loads between a loading site and a discharging site. An inflated lift balloon is loaded with ballast at a discharging site and propelled to a loading site. There, a load is suspended from the balloon and the ballast is removed. The removed ballast is moved or recirculated to the load discharging site as the balloon is propelled with its suspended load to that site. At the discharging site, the balloon is reballasted with the removed ballast and the load is discharged from the balloon.

In a preferred embodiment of the invention, the ballast is a liquid and it is moved by conveying it from the loading site through a conduit to the discharging site. Once there, the liquid is collected for reballasting the balloon.

To carry out the method of the invention, a system for transporting loads may be employed. The system includes a lift balloon having a liquid ballast container and a ballast site having liquid ballast and pump means for pumping the ballast. A flexible aerial conduit connects the ballast container to the ballast site. With such a system, the lift balloon may be directed to any number of loading sites to pick up loads such as felled logs in a forest. The pump means provides ballast to the ballast container through the aerial conduit for movement of the lift balloon to the loading site. At the site, a load may be suspended from the balloon and a corresponding amount of ballast is removed from the ballast container by the pump means, which pumps it back through the aerial conduit to the ballast site. The balloon is then directed to another loading site or to the discharging site, where the ballast is pumped back into the ballast container and the load is removed from the balloon.

In another aspect of the invention, the lift balloon includes means for aerodynamically streamlining its shape. The means comprise an elongated envelope having parallel opposed walls in its midsection for housing a lift balloon therein. The parallel walls converge at the envelope's end sections to form tapered ends, thereby reducing the drag. For a plurality of balloons within the envelope, the opposed walls of the midsection align the balloons in a single line which passes through the center of each balloon. The envelope may also include a rudder means for steering the overall apparatus.

The structure of the envelope may include rigid frame means for housing the balloon and fabric means disposed on the frame means. Alternatively, the envelope may comprise a nonporous material surrounding the balloon and forming airtight pockets between each balloon and the adjacent tapered end. The pockets are filled with air under a pressure greater than atmospheric pressure to provide shape to the envelope.

BRIEF DESCRIPTION OF THE DRAWINGS

FIG. 1 illustrates a method of aerially transporting loads by a lift balloon in which ballast is removed at a loading site and is directed through a conduit to a discharging site for reballasting the balloon.

FIG. 2 illustrates the method of FIG. 1 for transporting loads from a lower loading site to a higher discharging site.

FIG. 3 illustrates the method of FIG. 1 for transporting the load horizontally between a loading site and a discharging site, such as from ship-to-shore.

FIG. 4 is a pictorial view of a lift balloon employed in the system and method of the invention.

FIG. 5 is an illustration of a system incorporating the method of FIG. 1 in which the ballast is pumped through an aerial conduit.

FIG. 6 is a cross-sectional view of the aerial conduit of FIG. 5.

DETAILED DESCRIPTION

Figure 7:
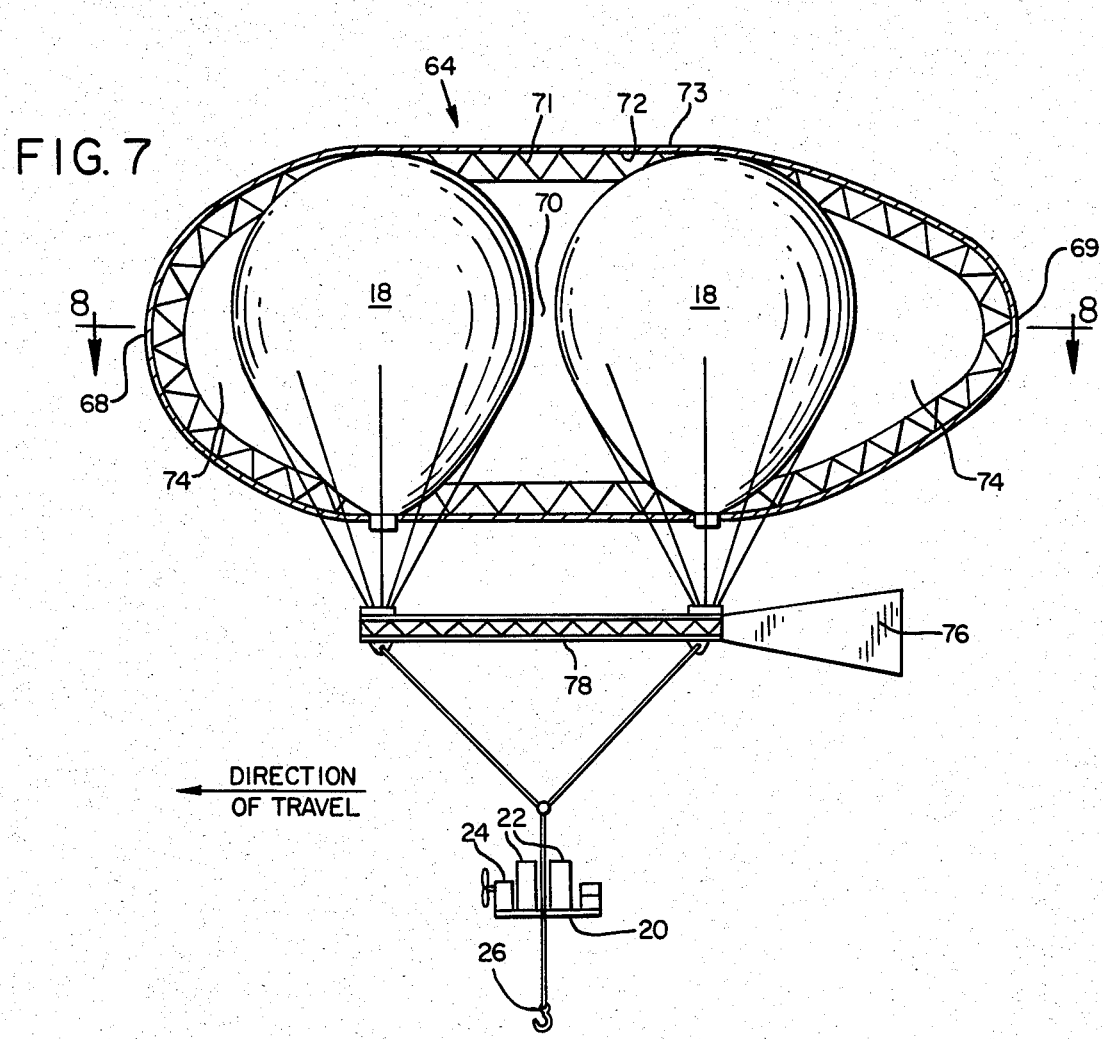
FIG. 7 is a vertical cross-sectional view of an elongated envelope for reducing aerodynamic drag on a conventional pear-shaped lift balloon.

A method for aerially transporting loads according to the invention is illustrated generally in FIGS. 1 through 3. In the method, a lift balloon 10 transports a suspended load 12 from a loading site 14 to a discharging site 16. Referring to FIG. 4, balloon 10 includes a pear-shaped helium lift bag 18 carrying a platform 20 that supports a ballast container 22 and a conventional propelling means 24. Below platform 20, a hook means 26 is used to hook load 12 to lift balloon 10.

Each site 14, 16 includes means for removing or adding ballast, respectively, from balloon 10. Referring again to FIGS. 1 through 3, container 22 is initially filled with ballast at discharging site 16 from a ballast tank 28, which is connected to ballast container 22 of balloon 10 by a connecting means such as pipe 30. A conventional pump 31 pumps liquid ballast 32 from tank 28 into ballast container 22 to provide the desired ballast to balloon 10. At loading site 14, a second ballast tank 34 receives ballast 32 from ballast container 22. Sufficient ballast is removed from container 22 to compensate for the weight of suspended load 12. Ballast tank 34 is connected to ballast container 22 by a second connecting means such as pipe 36 and recovers ballast therefrom by means of a pump 37 or by gravity, if sufficient. A conduit 38 connects ballast tank 28 to ballast tank 34.

FIG. 1 illustrates the method for transporting loads from a higher elevation to a lower elevation. Lift balloon 10 is initially filled with ballast 32 at discharging site 16 to be slightly positively buoyant so it can rise gradually. Balloon 10 is then propelled by propelling means 24 to loading site 14, as indicated by arrow 40. At loading site 14, liquid ballast 32 is removed from ballast container 22 into ballast tank 34 and a load 12 is suspended from lift balloon 10. Balloon 10 is then propelled downward back to load discharging site 16 as shown by arrow 42. Liquid ballast 32 is also moved downhill in the direction of arrow 44 from ballast tank 34 to discharging site 16 through the inclined conduit 38. At discharging site 16, the ballast is collected in ballast tank 28. Lift balloon is then reballasted with at least some of collected liquid ballast 32. Load 12, now at loading site 16, is removed from balloon 10 after the reballasting. The cycle may be repeated without need for additional ballast.

FIG. 2 illustrates the method for transporting loads from a lower elevation to a higher elevation. Lift balloon 10 is initially filled with sufficient ballast 32 at discharging site 16 to be slightly negatively buoyant to enable it to descend gradually. Balloon 10 is then propelled by propelling means 24 to loading site 14, as indicated by arrow 46. At the loading site, ballast 32 is removed from ballast container 22 into ballast tank 34 and load 12 is suspended from balloon 10. Balloon 10 is then propelled upwards back to discharging site 16, as shown by arrow 48. Removed ballast 32 is also pumped from ballast tank 34 back to discharging site 16 through conduit 38, as indicated by arrow 50, and into ballast tank 28. At discharging site 16, ballast 32 is collected in ballast tank 28. Balloon 10 is then reballasted with at least some of collected ballast 32. Load 12 may then be removed from balloon 10.

FIG. 3 illustrates the method as employed for delivering a load horizontally as in ship-to-shore. Balloon 10 is initially filled with ballast 32 at shore discharging site 16 to be neutrally buoyant. It is then propelled by propelling means 24 across water to ship loading site 14 as indicated by arrow 52. At the loading site, liquid ballast 32 is removed from ballast container 22 into ballast tank 34 and load 12 is suspended from lift balloon 10. Balloon 10 is then propelled back over the water to shore discharging site 16 as shown by arrow 54. The removed ballast 32 is also pumped back from ballast tank 34 to ballast tank 28, as shown by arrow 55, through a conduit 38'. At discharging site 16, lift balloon 10 is reballasted with at least some of the liquid ballast 32 delivered from ballast tank 34 to ballast tank 28. Load 12 may then be removed from lift balloon 10.

To increase the versatility of the method, a further embodiment of it may be employed as illustrated in FIG. 5. A flexible aerial conduit 56 is shown connecting ballast container 22 of lift balloon 10 to a single ballast tank 58 and a pump 60 at discharging site 16. Aerial conduit 56 is supported by an inflated, segmented sleeve 62, as shown in cross section in FIG. 6. This allows the conduit to follow balloon 10 to any number of loading sites, for example, sites 14a through 14g. Pump 60 pumps liquid ballast 32 into ballast container 22 in an amount to buoy lift balloon 10 controllably as it leaves the ground and is directed to a loading site 14a. To lower the balloon to load 12, additional ballast may be pumped into ballast container 22 from ballast tank 58 by pump 60. Once load 12 is hooked to balloon 10, a pump 63 associated with ballast container 22 pumps ballast from container 22 until balloon 10 rises to a desired elevation. The removed ballast may be pumped back through conduit 56 to ballast tank 58 for storage or disposed on the ground. Balloon 10 may then be directed to another loading site or to discharging site 16.

As shown in FIG. 4, lift balloon 10 comprises a conventional pear-shaped helium filled lift bag 18 for providing lift. However, this bag shape causes excessive aerodynamic drag which slows the movement of the balloon, particularly if several helium bags 18 are used to lift a load 12. In another aspect of this invention, an elongated envelope 64, shown in FIGS. 7 and 8, may be used to house a single bag 18 or a plurality of helium bags 18 to reduce the drag in the direction of travel shown in FIG. 7. Envelope 64 has parallel opposed walls 66 (see FIG. 8) in its midsection which converge to form tapered ends 68, 69 at its end sections. The opposed walls align bags 18 in a single line 70 which passes through the center of each bag.

Figure 8:
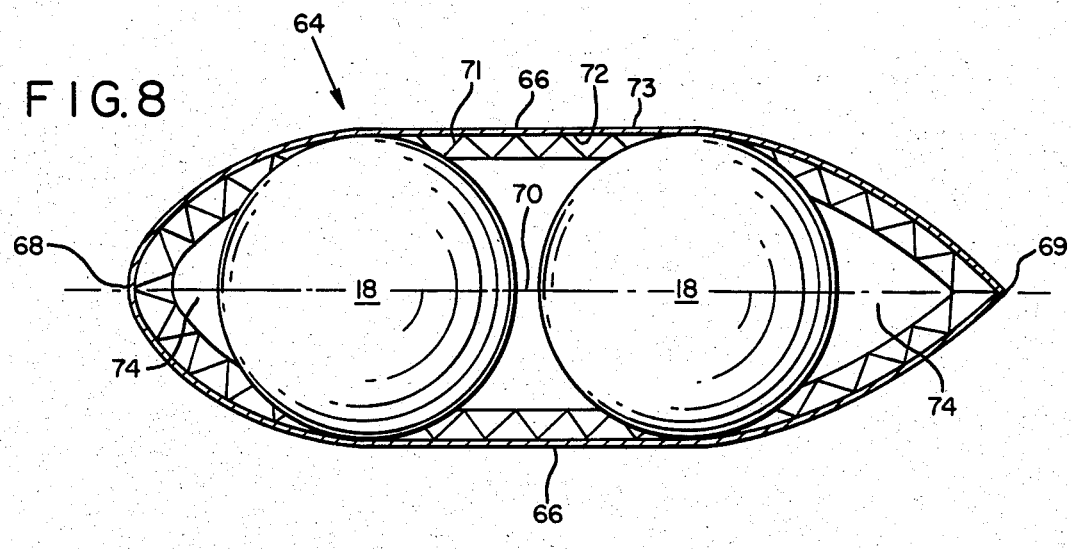
FIG. 8 is a sectional view taken along line 8—8 of FIG. 7.

Envelope 64 may be constructed in a number of ways. FIG. 7 shows a cross-sectional view of envelope 64 with a rigid frame 71 for housing bags 18 and a fabric means 72 disposed on frame 71. Fabric means 72 may further comprise an air-impermeable or nonporous material 73 surrounding balloons 18 and forming airtight pockets 74 between bags 18 and tapered ends 68. Pockets 74 are pressurized to a pressure greater than atmospheric pressure to provide a streamline shape to envelope 64.

Envelope 64 may be combined with propeller means 24 and a rudder 76 to provide propulsion and steering to balloon 10. These components may be mounted on a second platform 78, as shown in FIG. 7.

Having illustrated and described the principles of the invention in a preferred embodiment, it should be apparent to those skilled in the art that the invention can be modified in arrangement and detail without departing from such principles. I claim all modifications coming within the spirit and scope of the following claims.

I claim:

1. A method of aerially transporting loads between a loading site and a discharging site, comprising the following steps:

loading an inflated lift balloon with ballast at the discharging site;

propelling the ballasted balloon to the loading site;

suspending a load from the balloon at the loading site;
removing ballast from the balloon at the loading site;
moving the removed ballast to the discharging site;
propelling the balloon with its suspended load to the discharging site;
reballasting the balloon with the removed ballast at the discharging site; and
discharging the load from the ballasted balloon at the discharging site.

2. The method of claim 1 in which the ballast is liquid and moving the ballast includes:
conveying the liquid from the loading site through a conduit to the discharging site; and
collecting the liquid at the discharging site.

* * * * *